(No Model.) 11 Sheets—Sheet 1.

L. EHRLICH.
ELECTRICAL CASH REGISTER, RECORDER, AND INDICATOR.

No. 502,287. Patented Aug. 1, 1893.

(No Model.) 11 Sheets—Sheet 2.

L. EHRLICH.
ELECTRICAL CASH REGISTER, RECORDER, AND INDICATOR.

No. 502,287. Patented Aug. 1, 1893.

Witnesses
Jno. G. Hinkel, Jr.
H. S. McArthur

Inventor
Leo Ehrlich,
By his Attorneys
Foster & Freeman (No Model.) 11 Sheets—Sheet 6.
L. EHRLICH.
ELECTRICAL CASH REGISTER, RECORDER, AND INDICATOR.
No. 502,287. Patented Aug. 1, 1893.
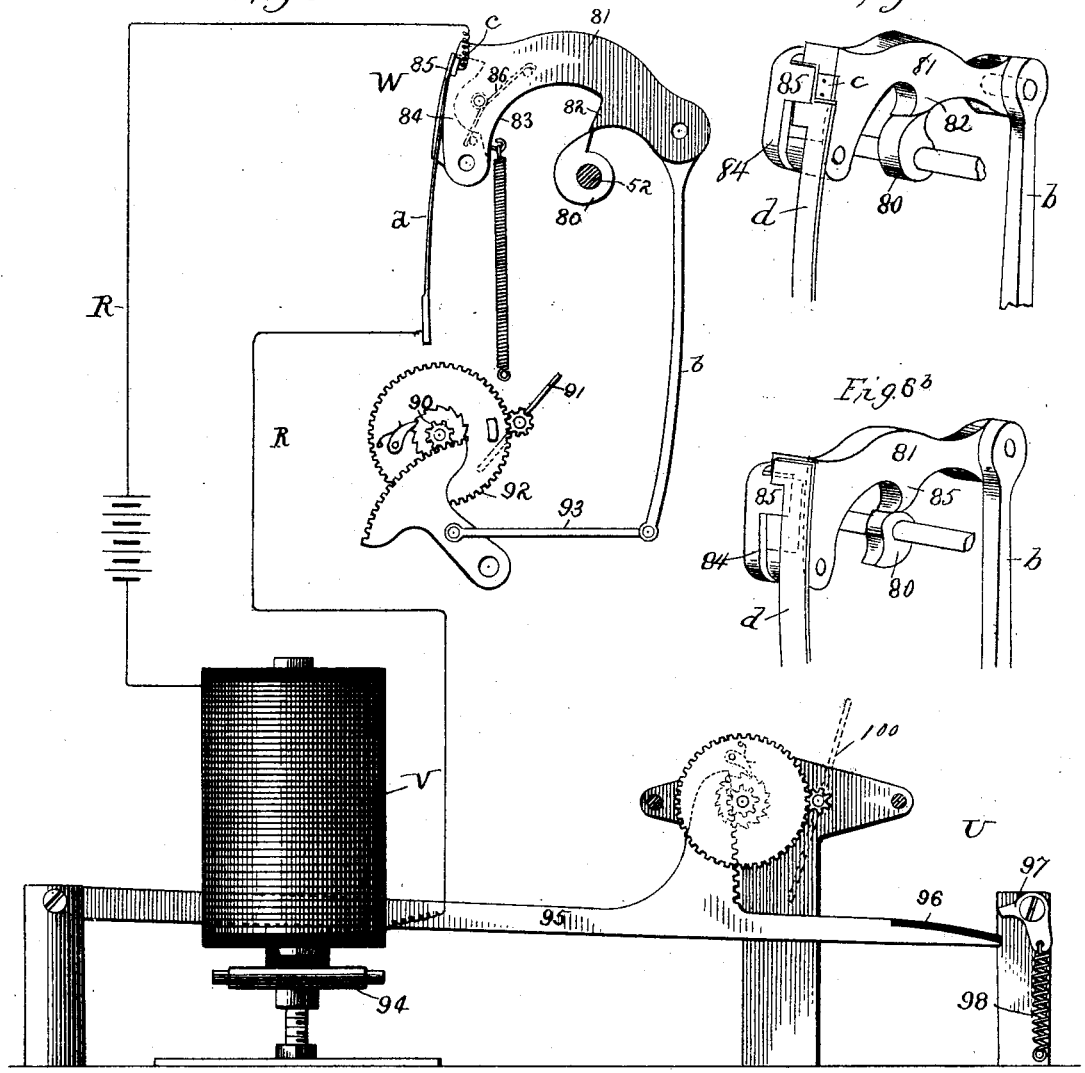
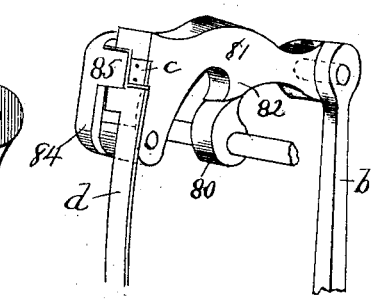
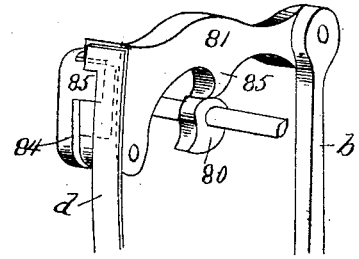
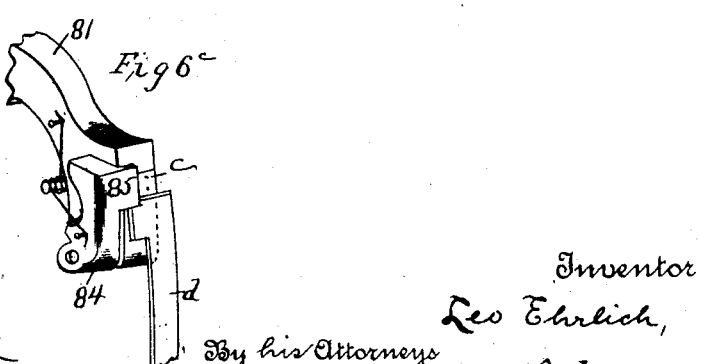

(No Model.) 11 Sheets—Sheet 7.
L. EHRLICH.
ELECTRICAL CASH REGISTER, RECORDER, AND INDICATOR.
No. 502,287. Patented Aug. 1, 1893.
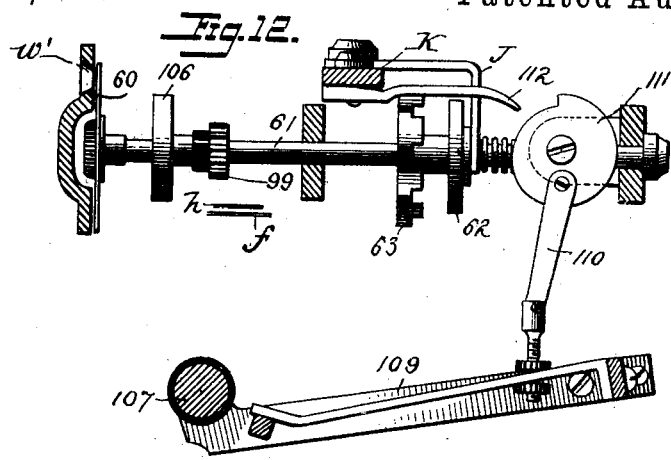
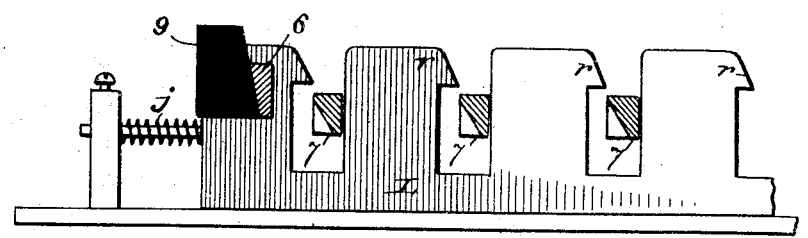
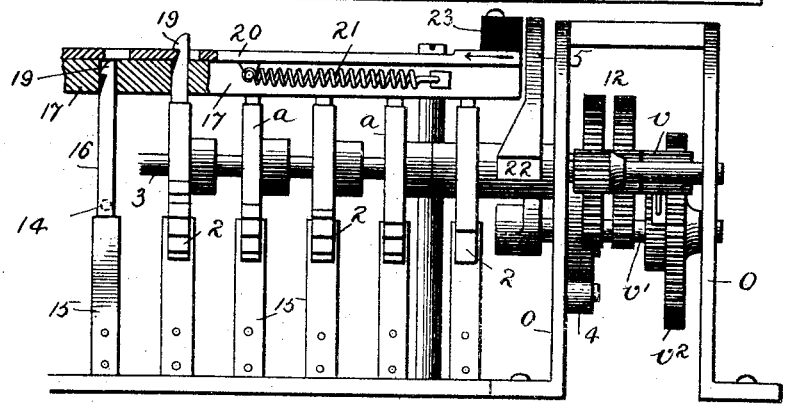
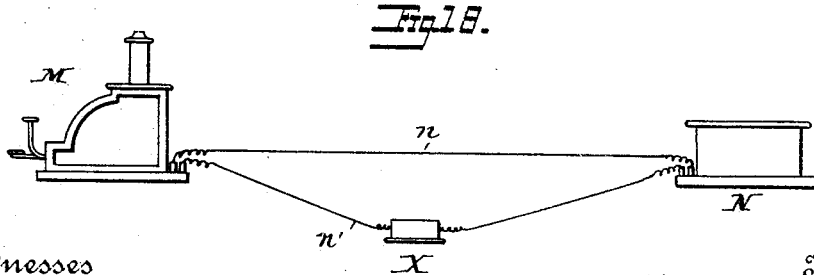
Witnesses
Inventor
Leo Ehrlich,
By his Attorneys
Foster & Freeman

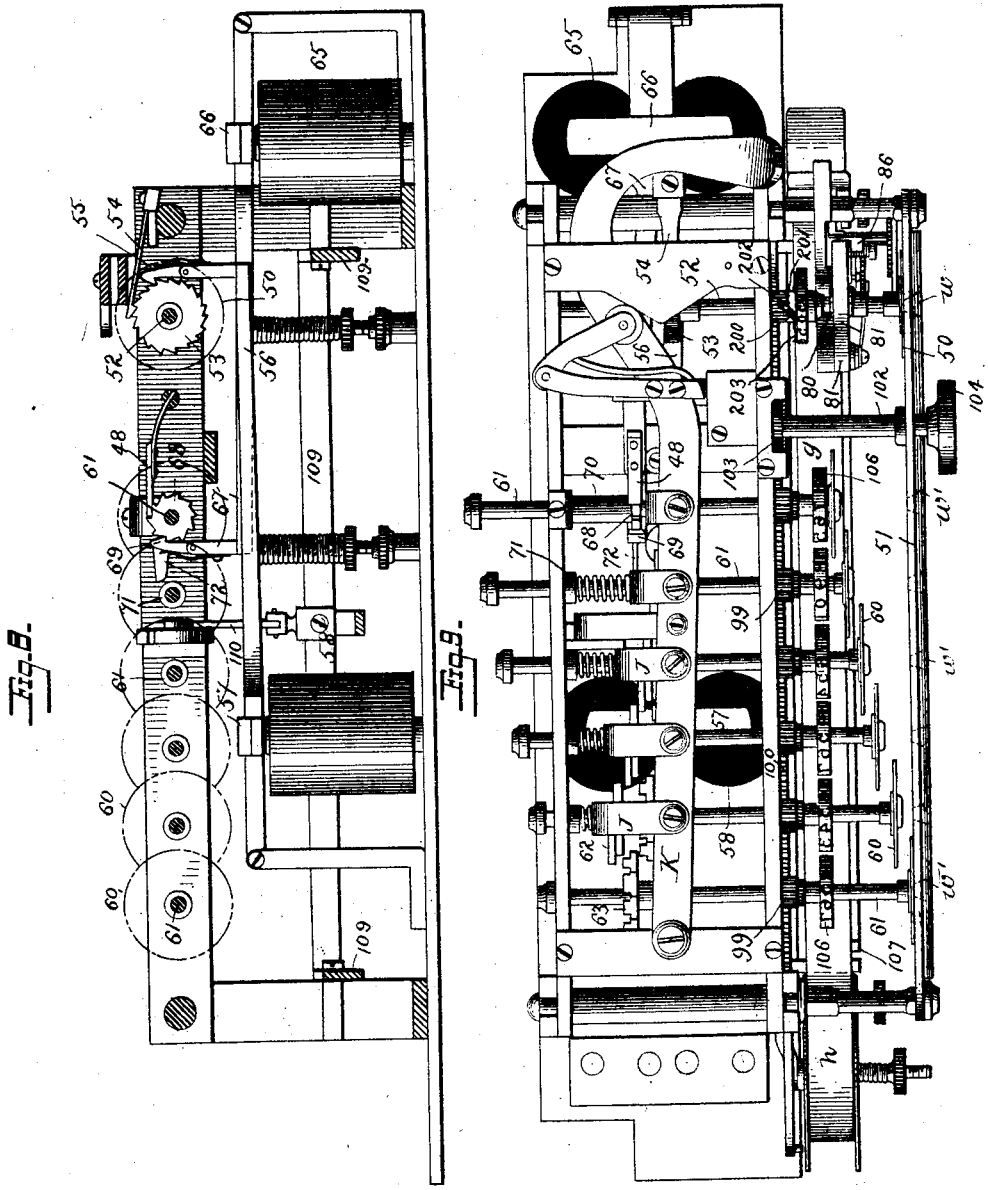

(No Model.)
L. EHRLICH.
ELECTRICAL CASH REGISTER, RECORDER, AND INDICATOR.
No. 502,287.  Patented Aug. 1, 1893.
11 Sheets—Sheet 9.
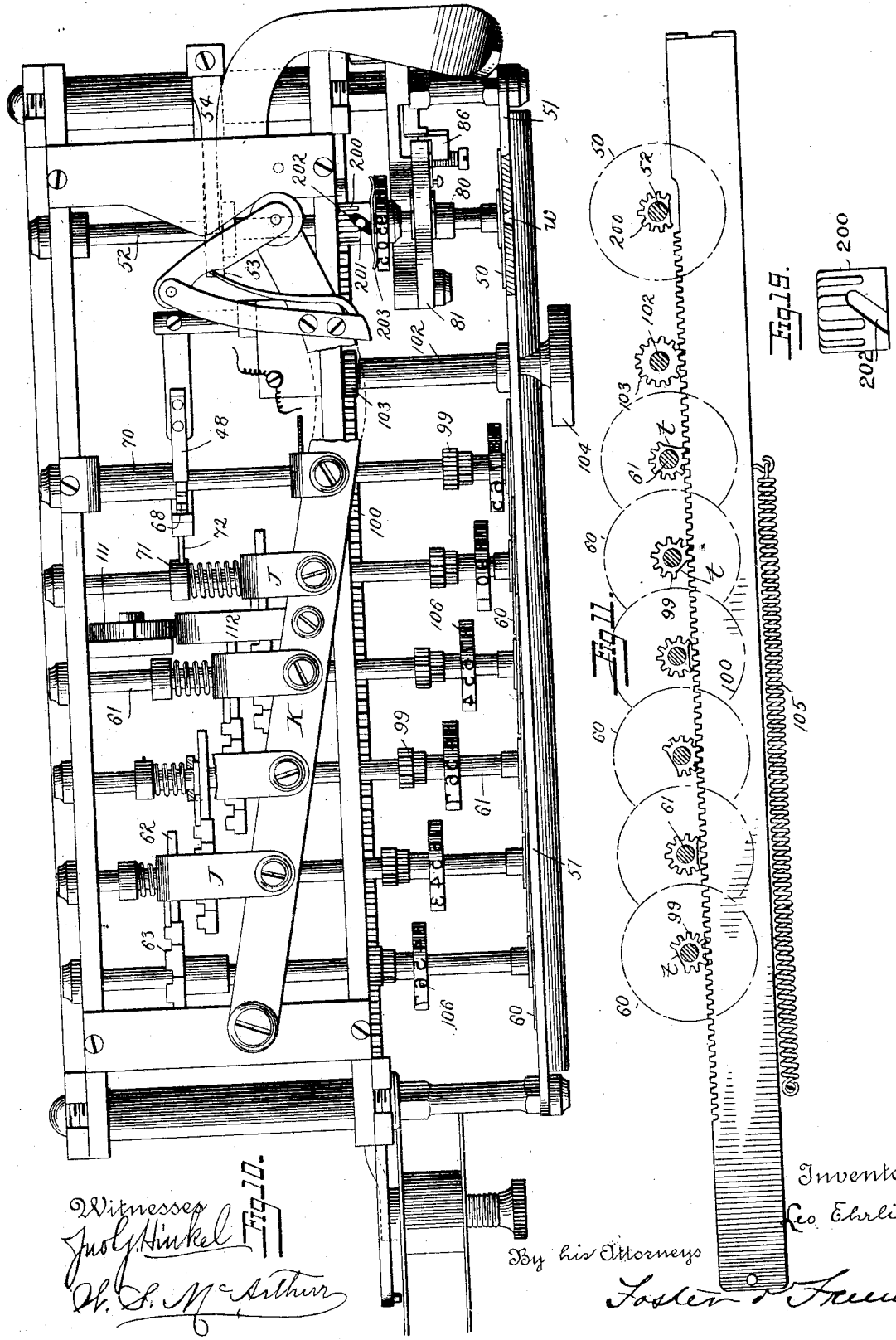
Witnesses
Judy Hinkel
W. S. McArthur
Inventor
Leo Ehrlich,
By his Attorneys
Foster & Freeman

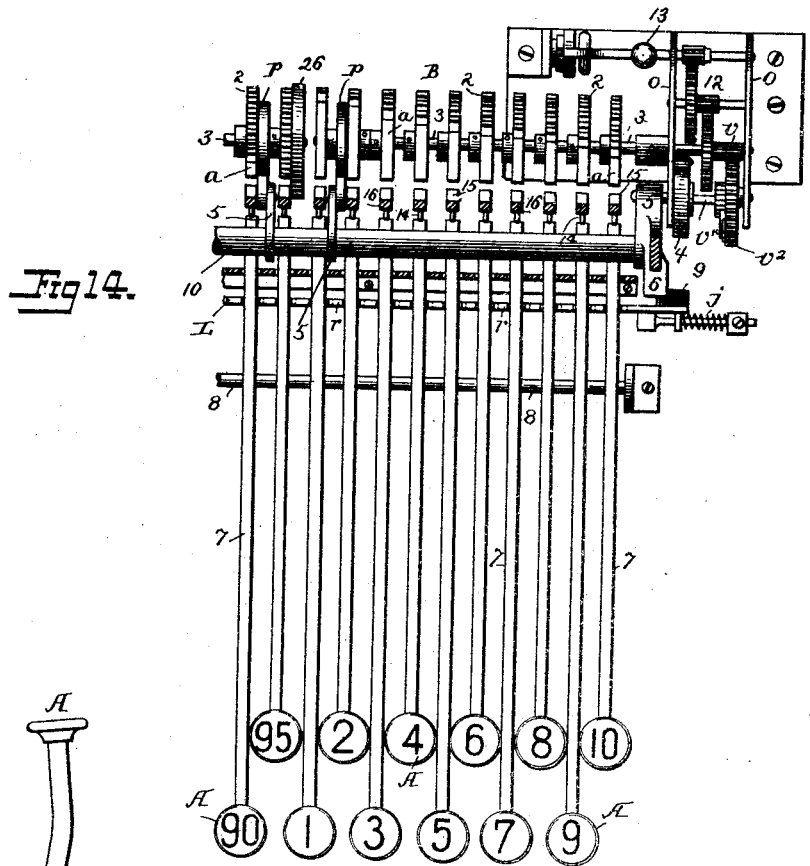

(No Model.) 11 Sheets—Sheet 11.
L. EHRLICH.
ELECTRICAL CASH REGISTER, RECORDER, AND INDICATOR.
No. 502,287. Patented Aug. 1, 1893.
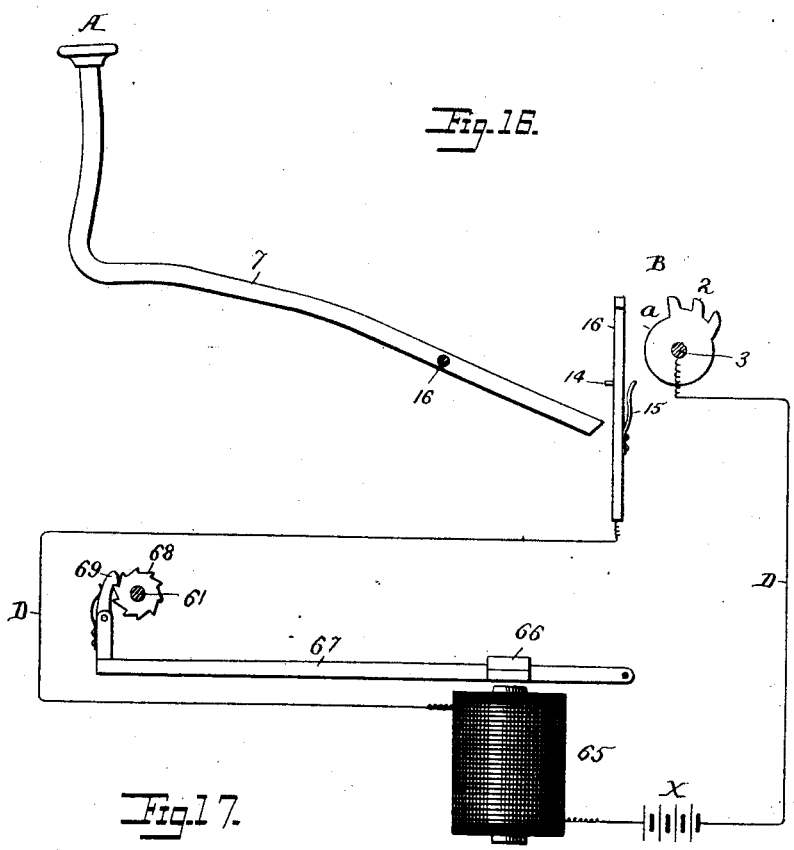
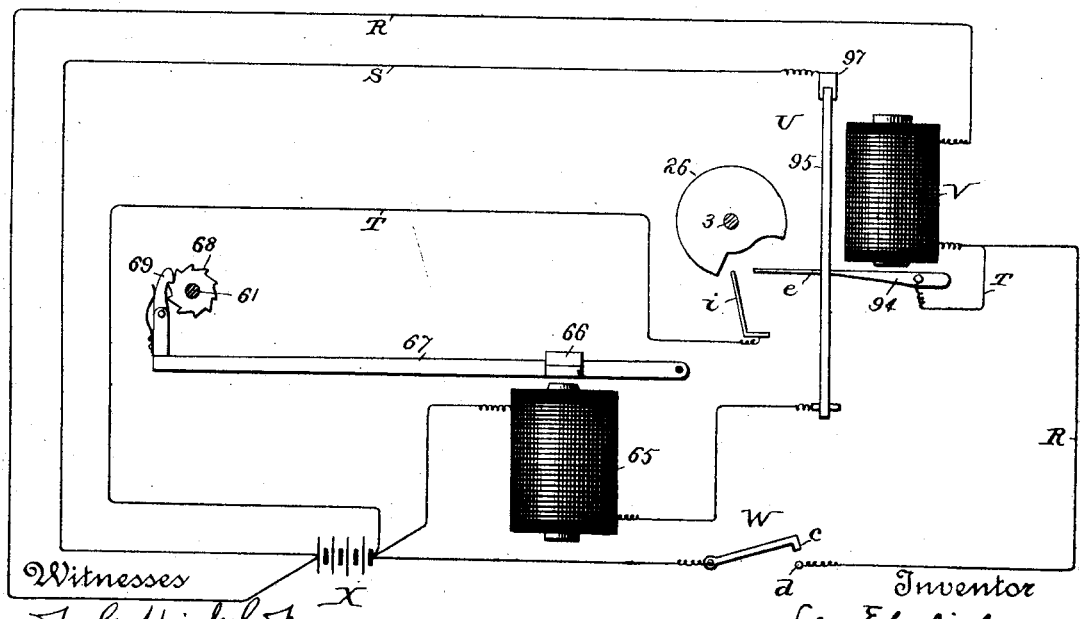

UNITED STATES PATENT OFFICE.

LEO EHRLICH, OF ST. LOUIS, MISSOURI, ASSIGNOR, BY MESNE ASSIGNMENTS, TO THE NATIONAL CASH REGISTER COMPANY, OF DAYTON, OHIO.

ELECTRICAL CASH REGISTER, RECORDER, AND INDICATOR.

SPECIFICATION forming part of Letters Patent No. 502,287, dated August 1, 1893.

Application filed September 28, 1889. Serial No. 325,382. (No model.)

*To all whom it may concern:*

Be it known that I, LEO EHRLICH, a citizen of the United States, residing at St. Louis, State of Missouri, have invented certain new and useful Improvements in Electrical Registering Devices, of which the following is a specification.

My invention relates to devices for registering numbers, indicating the amount of sales, receipts, disbursements, &c., and my invention consists, among other things, of a registering device having two main portions which may be used in proximity in a single structure or at widely separated points, one portion having a frame supporting the keys and a series of circuit closers, the other portion supporting a counter or indicator with operating magnet or magnets and electric conductors extending between the two and including a battery or other generator.

It also consists in other novel structures, arrangements and combinations of parts all as fully set forth hereinafter and as illustrated in the accompanying drawings, in which—

Figure 1:
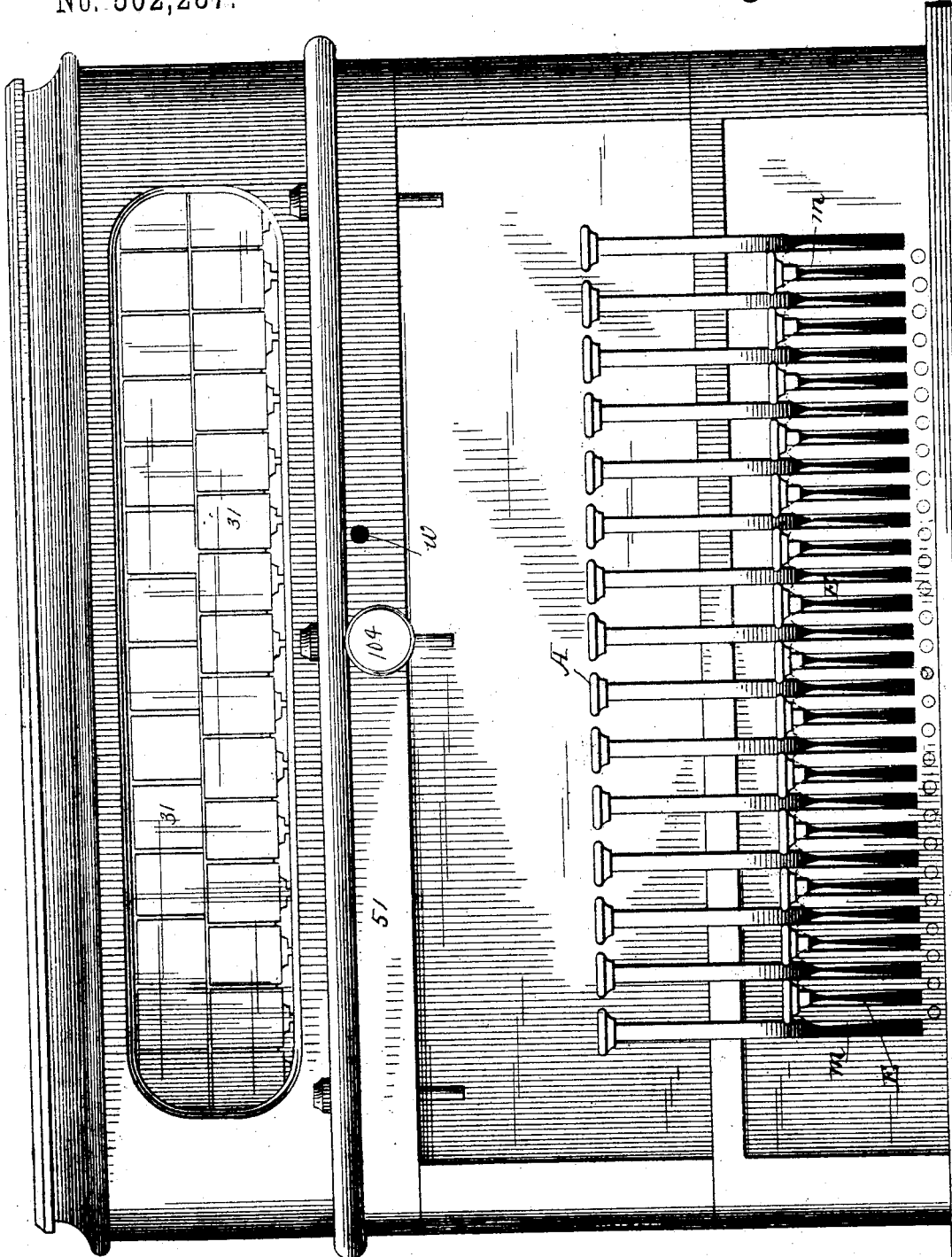
Figure 2:
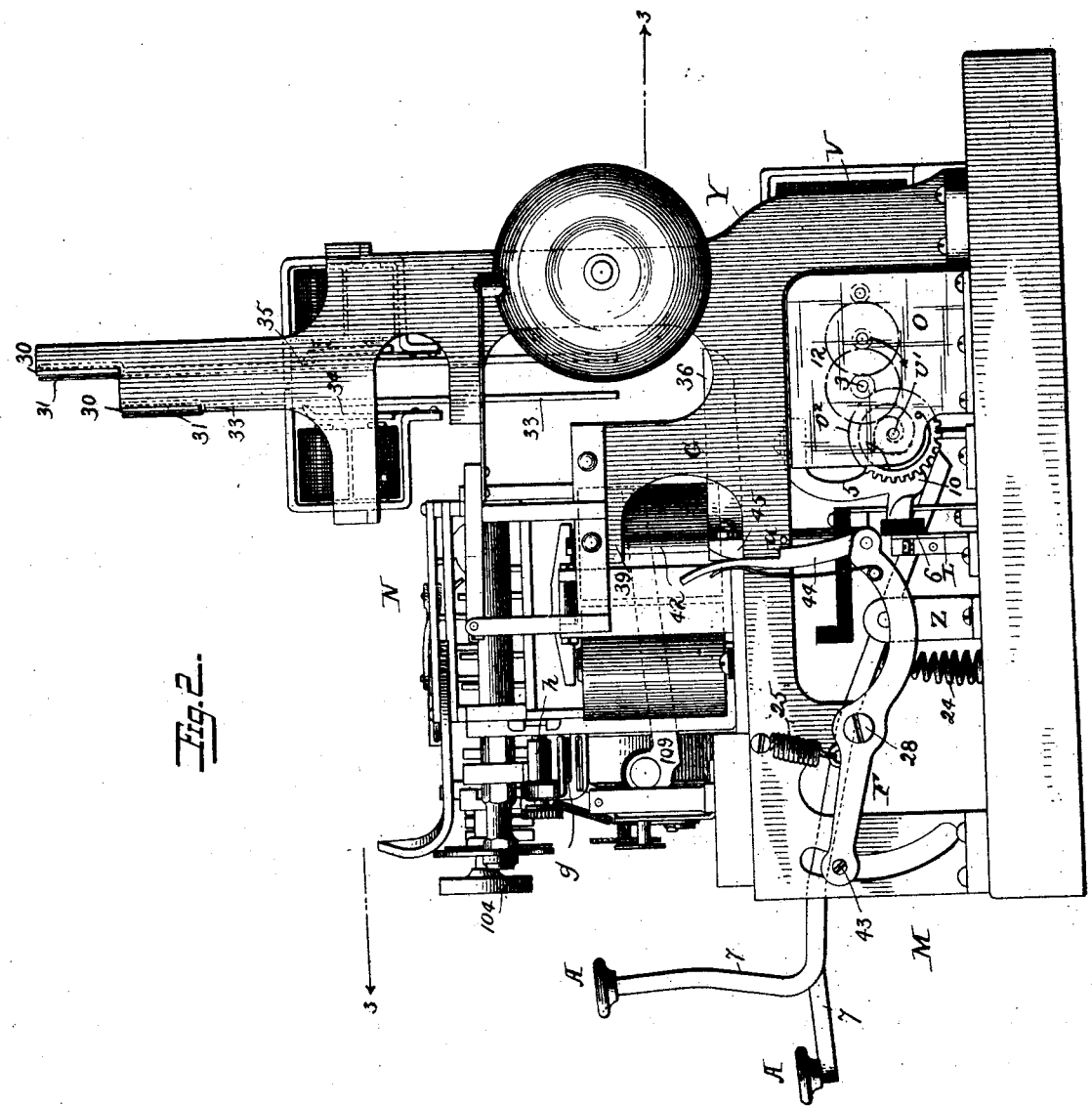
Figure 3:
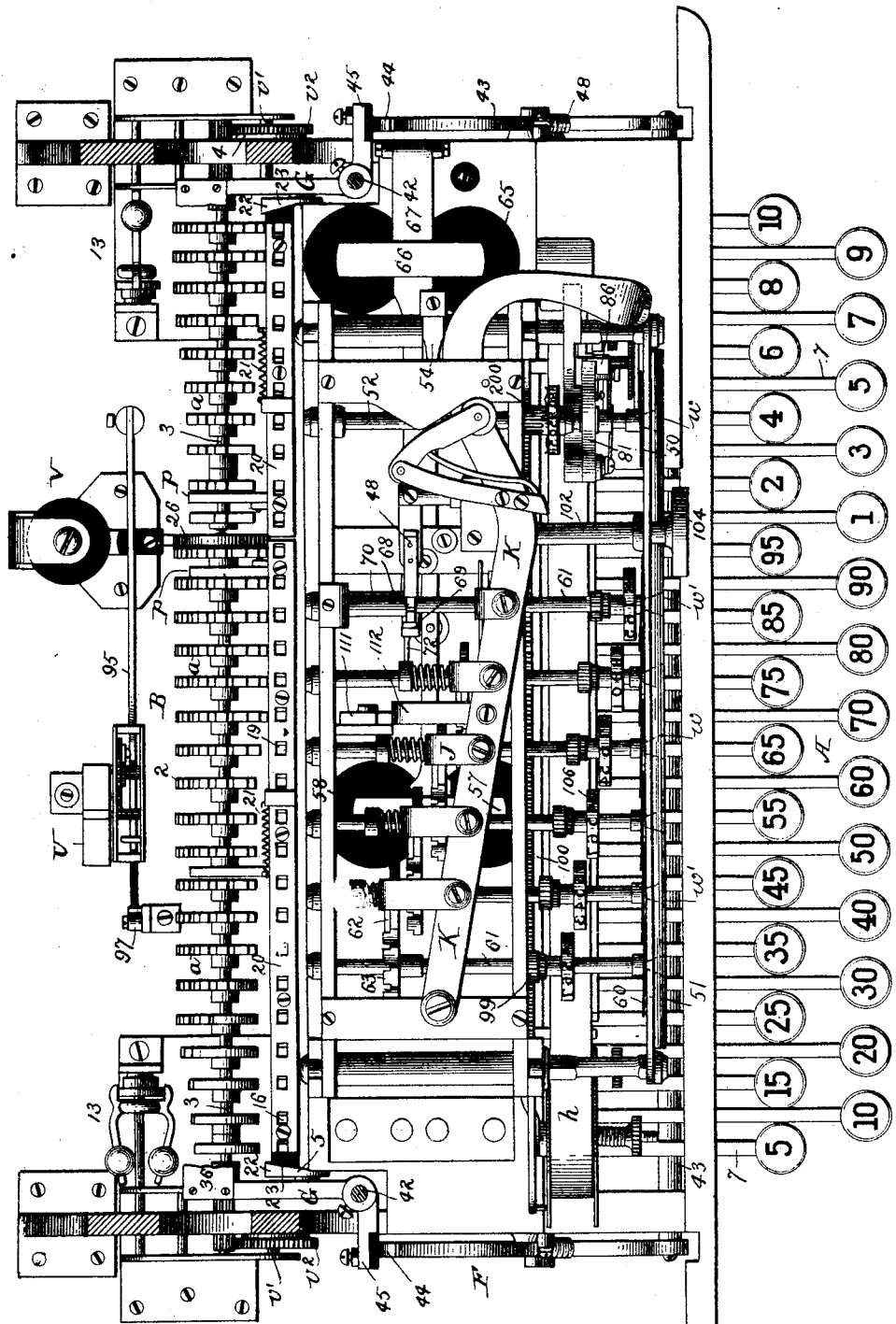
Figure 4:
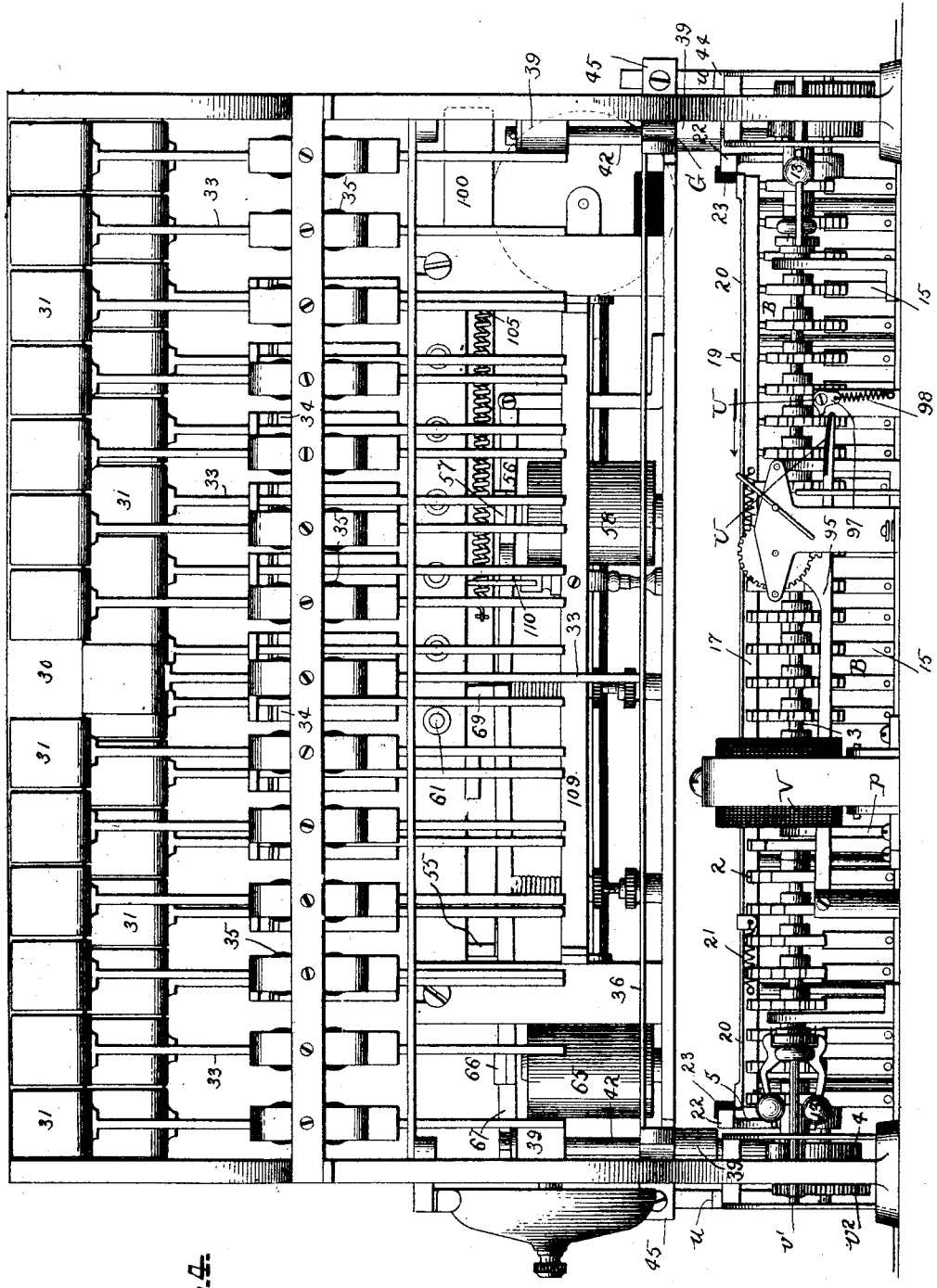
Figure 5:
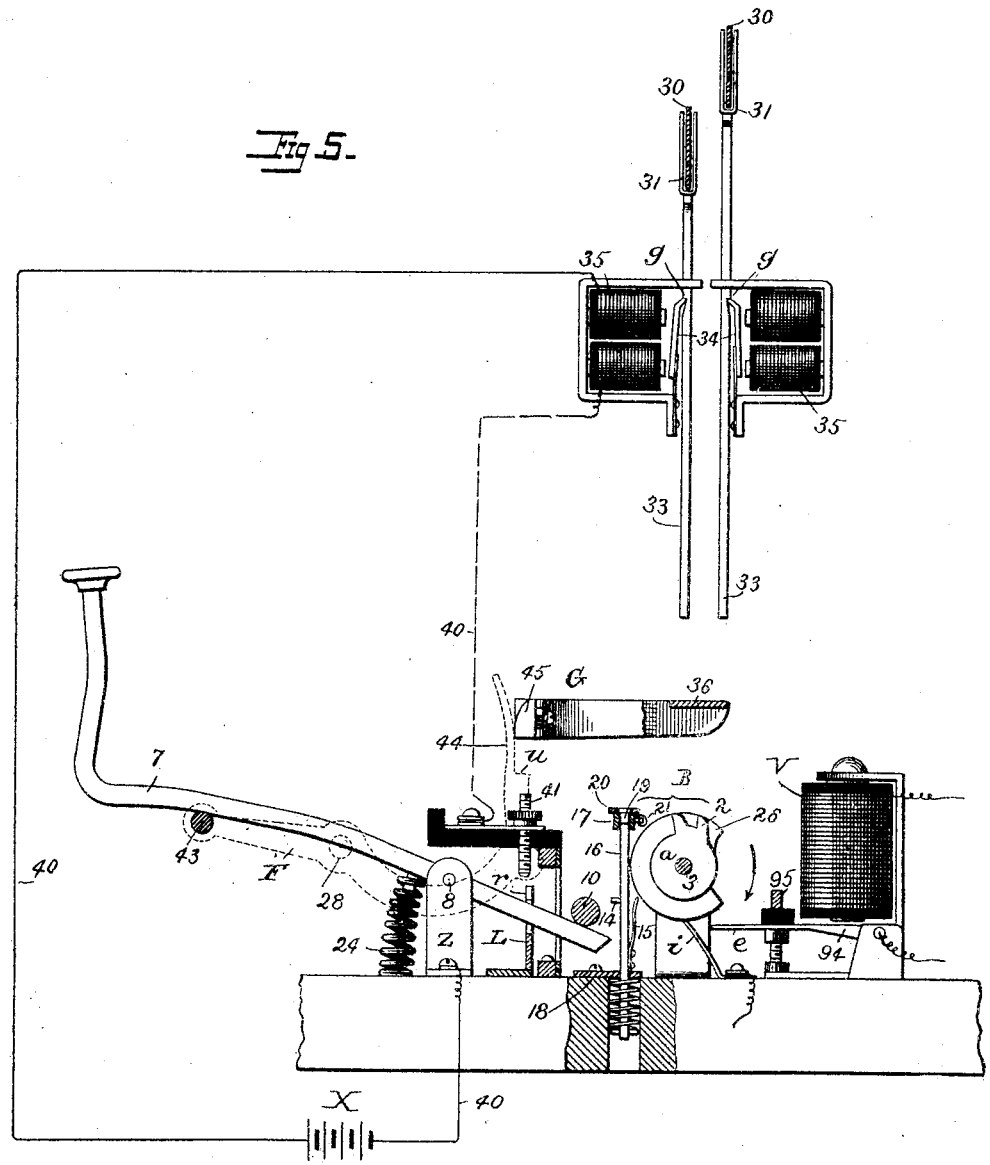

Figure 1 is a front elevation of my improved register, both portions shown as included in a single case which is shortened and the number of keys reduced to come within the limits of the sheet. Fig. 2 is an end view of the same, the parts being shown in their normal positions; the case being removed. Fig. 3 is a sectional plan view, taken approximately on line 3, 3, Fig. 2. Fig. 4 is a rear elevation of the working parts without the case. Fig. 5 is a transverse section showing one of the keys and part of the connected devices. Fig. 6 is a diagrammatic view illustrating means for preventing simultaneous currents to the higher register. Figs. $6^a$, $6^b$, and $6^c$ are detailed views hereinafter referred to. Fig. 7 is a detached rear elevation showing the circuit breaker and connections operated by the keys. Fig. 8 is an elevation in part section of the registering section of the machine. Fig. 9 is a plan of the registering section, the parts being shown in the positions they occupy at the time the printing mechanism is to be operated. Fig. 10 is an enlarged plan of part of the registering section. Fig. 11 is a longitudinal section illustrating the restoring mechanism of the registering section. Fig. 12 is a transverse section illustrating the printing mechanism of the registering section. Fig. 13 is a detached view of the catch device or lock for holding the key levers until the circuit closers have completed their movements. Fig. 14 is a sectional plan view of a portion of the circuit closers of the dollar bank of keys and their immediate connections. Figs. 15 to 17 inclusive are diagrammatic views of some of the electric circuits in the machine. Fig. 18 is a diagrammatic view illustrating the use of the register when in two separated sections electrically connected. Fig. 19 is an enlarged view of one of the pinions of the counter.

The machine consists essentially of two main portions, first, the key section M, and second, the registering section N. The key section is provided with one or more banks of keys A, two being shown, viz: the "cents" bank at the left hand of the machine and the "dollars" bank at the right hand, the operation of which serve to register in the registering section, cents and dollars respectively, through the medium of series of electric impulses or currents as set forth hereinafter. With each key A is combined a movable circuit closer B (Figs. 3, 4, and 5) connected to be moved in one direction by the operation of a key, and in the other by a weight, spring or other suitable motor. Such circuit closer may be of any known or suitable construction, and may slide, vibrate or revolve, and may be operated through the medium of any suitable connections. As shown each circuit closer B consists of a disk $a$ with contacts or teeth 2, and a spring or contact piece 15 (Fig. 5). When two or more banks of keys are employed, the series of disks pertaining to the keys of each bank are fixed upon a single shaft 3, there being two banks of keys. There are two independent shafts 3, and each shaft at opposite sides of the machine finds a bearing in a frame O and the abutting but separated ends near the center of the machine find bearings in brackets $p$. The outer end of each shaft is geared through a pinion $v$ to a toothed wheel $v^2$, turning on a shaft $v'$ connected therewith by a pawl and ratchet. A coiled spring 4, one end secured to the shaft and the other to the frame O, tends to turn said wheel and revolve the shaft 3 in the direction of the arrow, Figs. 2, 5, and 14. Each key is connected with or forms part of a lever 7 pivoted upon a rod 8 that is supported by brackets Z, one at each side of the machine, and the rear end of the key lever extends below a cross bar 10, one for each bank of keys, carried by two pivotal arms 5, one secured to the shaft $v'$ and the other to a pivot on the bracket $p$ in line therewith and parallel with the shaft 3. As any key in a bank is depressed its lever lifts the bar 10 of that bank, rocks the arms 5 and the shaft $v'$, winding up the spring 4, and as the key is released the recoil of the spring 4 rocks the shaft 3 through the gearing $v^2, v$, in the direction of the arrow Figs. 2 and 5, a train of gears 12, and a brake governor 13 limiting the rapidity of the movement under the action of the spring. When the key is released after being depressed, it is returned to its normal position by a spring 24. In so doing the bar 10 will be free to return to its normal position, arriving there immediately after the shaft 3 has completed its revolution and comes to rest. The number of contacts 2 upon each disk $a$ depends upon the number of impulses to be transmitted by that circuit closer to the magnet of the register, and corresponds with the number on or value of the key. In the apparatus shown the keys of the "cents" bank are numbered in multiples of five, as 5, 10, 15, &c., and in the "dollars" bank they are numbered from 1 to 10, inclusive. The contact piece 15 of each circuit closer when a key is depressed is brought into position to be touched successively by the teeth 2 as the disk moves, each contact completing an electric circuit through the electro-magnet of the register. Different means may be employed for moving each contact piece 15, so that the circuit will be completed only through the circuit closer pertaining to the key depressed. Thus each contact piece 15, Figs. 5 and 7, is carried by a slide 16 movable vertically in guides 17, 18, of the frame and provided with a shoulder 14 against which the tail of the key lever is brought as the key completes its descent, the slide and its contact piece being thus lifted.

On the top of the guide 17 slides a plate 20, slotted for the passage of the heads or ends of the slides 16, each of which is beveled and provided with a shoulder 19, as shown in Fig. 7, so that as any one slide rises its beveled face makes contact with the edge of the adjacent slot and forces the plate longitudinally until the shoulder 19 is above the plate, when a spring 21 retracts the latter, carries it below the shoulder and holds the slide elevated with the contact piece 15 in position to make contact with the teeth 2 of the adjacent disk. As the shaft 3 is now turned after the release of the key, only the contact piece 15, that has been elevated makes contact with the teeth of the adjacent disk, all of the other contact closers being out of operation, and as the revolution of the disk is completed, a cam 22 on one of the arms 5 is brought against a bearing 23 on the slide 20 and pushes the latter in the direction of the arrow Figs. 4 and 7, until the plate 20 passes from below the shoulder 19 when the slide 16 will fall to its first position.

The register section N is preferably provided with two indicators one in the form of a counter which registers the sum of the different amounts recorded, the other consisting of a series of tablets or visual indicators, one for each key, and marked to correspond with the figure upon the key. The tablets may be hung to move into and from their displayed positions in any suitable manner, but as shown each tablet is fixed, the figures being delineated upon two parallel strips 30, 30, properly supported in the machine (said figures being duplicated on opposite sides thereof) and being covered each by a guard 31 having two screens, one opposite each side of the strip as shown in Fig. 5. The screens are secured to movable staffs 33 sliding vertically in bearings of the frame, and each with a shoulder $g$, which when the screens cover the tablet, is in position to receive the end of an armature 34 of an electro-magnet 35. The coil of each magnet is in a circuit which is completed or broken by the movement of the key corresponding therewith so that when any key is depressed a circuit will be completed and a magnet will be excited drawing in the armature supporting the screen that covers the tablet corresponding to the key depressed, and allows said screen to move to uncover its tablet. Each tablet is exposed until the depression of another key, when a vertically movable plate 36 will be raised and striking the end of the depressed staff will lift the latter until the armature of the magnet previously excited engages with its shoulder and acts as a detent to hold it in place.

Different appliances may be used for completing or breaking the circuits and lifting the plate at the proper times. As shown, each key lever 7 (Fig. 5) is electrically connected with a battery by a conductor 40, including the magnet 35 and connected with a stop 41, insulated from the frame supporting it and arranged above the key-lever 7 to be struck thereby as the key completes its full movement, thus closing the circuit and exciting the magnet.

The plate 36 forms part of a sliding frame G (Figs. 2, 3, 4 and 5) moving through rods 42 in guides 39 and lifted on the movement of any lever 7 in either bank, through the medium of a rock-frame F hung on pivots 28, having a cross bar 43 extending beneath the levers and carrying two pivoted arms 44, one on each side of the machine. Each of said arms is provided with a shoulder $u$ that engages a lug 45 on the frame G when the outer end of the rock-frame F is depressed on depressing any key, the frame G being thus lifted. After the frame G has reached its upper position the shoulders of the arms 44 escape from contact with the lugs 45 and the frame G then descends to permit the descent of any staff that may be released; and this reverse movement of the frame G may be effected by a spring or weight. When the key is released, the frame F is returned to its normal position either by its own weight or by a spring 25.

The first action in depressing a key is to lift any staff and screen that have been dropped, then to wind up the spring 4 and then, after the arms 44 have escaped from the lugs 45, and the frame G descends, to complete the circuit through the magnet 35 and release the screen connected with that key, these operations resulting successively in depressing a key.

The counter portion of the registering section may be of any usual or suitable construction but as shown is in two sections, the cents section connected with the cents bank of keys and the dollars section connected with the dollars bank of keys. The cents section is provided with a disk 50 (Figs. 3, 8, 9 and 10) which revolves behind a plate 51 preferably forming part of the front of the outer case and having a sight opening *w*, Fig. 10 the disk being mounted upon a shaft 52 and having a series of figures from 0 to 99 or, when as shown, the registering is by multiples of five, from 0 to 95. On the shaft 52 is a ratchet wheel 53 (Figs. 8 and 9) having twenty teeth with which engages a spring detent pawl 54 secured to the frame, and an actuating pawl 55 pivoted to an arm 56 carrying the armature 57 of an electro-magnet 58. The magnet 58 is in a circuit C, Fig. 15, including the battery and each contact closer B of the cents bank of keys so that as the disk *a* revolves and the circuit is made and broken the magnet 58 will be repeatedly excited and discharged, the armature will be vibrated a corresponding number of times, and the shaft 52 will be turned step by step until the number added to that last exposed at the sight opening *w* is increased by that on the key depressed. Thus if the disk 50 exposed "5" through the sight opening *w*, and the key depressed represents ten cents, the contact piece 15 adjacent to the disk *a* having two teeth will be moved so that in the movements of the disk two impulses will be sent over the circuit and the armature vibrated twice and the shaft 52 will have been turned two steps and have turned the disk until it exposes 15 through the sight opening.

The dollars section of the counter is provided with a number of disks 60, representing units, tens, hundreds, &c., of dollars, each upon a shaft 61 and each disk is numbered from 0 to 9 and the numbers are exposed through sight openings *w* in the plate 51. Motion is conveyed from each lower shaft to that next above it as usual by a disk and one tooth 62 engaging with a notch of a notched disk 63 on the next shaft, Figs. 3 and 10. Motion is communicated from any key of the dollar bank to the first or unit dollar shaft 61, through the medium of an electro-magnet 65 in a circuit D, Fig. 16, including the battery and one of the circuit closers B of the dollars section, as with the actuating devices of the cents bank, the armature 66 of the magnet 65 being carried by an arm 67 carrying an actuating pawl 69 that engages with the teeth of a ratchet 68 on the lowest shaft 61, or as shown on a sleeve 70 in which the said shaft 61 slides without turning therein. A stop pawl 48 prevents the ratchet 68 from turning backward, and a stop 71, formed by a collar on the adjacent shaft 61, is arranged so as to be struck by a lug 72 on the pawl 69 as the latter descends so as to prevent the pawl descending the distance of more than one tooth, and forces the pawl against the ratchet creating such friction as will prevent the ratchet from being carried beyond its position by momentum.

It is necessary whenever the cents section of the counter has had put upon it the sum of one dollar or exceeding one dollar to transfer one to the dollar section, or indicate upon the latter, an increase of one dollar on the amount already recorded, and I provide means for effecting this result automatically. If there was no possibility of interference between the actions of the dollar bank of keys and of the transfer devices, it would be sufficient to provide means whereby on the completion of a revolution of the cents disk or indicator 50, a current should be sent through the magnet 65 to move the pawl 69 once and set forward the lowest disk or indicator 60 of the dollars section of the counter one step. It happens, however, that at times a dollar key is depressed at the instant that the cents disk or indicator 50 completes a revolution, so that at that instant two currents would be transmitted to the magnet 65, one from the transfer device and one from the circuit closer of the dollars section, and only one movement of the armature 66 could be effected, instead of two, and there would be in such case no indication of the number desired to be transferred. To avoid this result I provide means whereby in such a contingency a transmission of the current caused by the transfer device is delayed until the current or currents caused by the dollars circuit closer have acted, when an additional impulse will be sent producing the added motion required.

It will be evident to those skilled in the art that different retarding devices may be used, and I will now proceed to describe those which I have found effective. The device consists of a circuit closer W, Figs. 6 and 17, (it might be a circuit opener, if the devices were arranged to operate on an open circuit) operated to close a circuit R including a shunt magnet V, and a second circuit closer U put into operation by said shunt magnet to close a circuit S, Fig. 17, including the magnet 65 of the dollars section. In connection with the circuit closer W the shaft 52 carrying the disk 50 of the cents section, Figs. 6 and 9, is provided with a cam 80 with an abrupt shoulder over which extends a pivoted arm 81 of the circuit closer (insulated or of non-conducting material, as rubber) having a downwardly projecting tongue 82 and curved terminal finger 83 on the edge of which is a metallic plate or terminal $c$ in the circuit R, with the shunt magnet V, at the back of the machine. To the finger 83 of the arm 81 is pivoted a guard 84 held to the finger by a spring 86, which guard has a shield 85 that covers the terminal $c$ and prevents the contact therewith of a spring terminal $d$, when the arm 81 is ascending by the force of the cam 80, but which permits a lip on the terminal $d$ to pass between it and the arm and make contact with the terminal $c$ when the arm 81 moves downward. The terminal $d$ is also in the circuit R including the shunt magnet V, and these two terminals $c$, $d$, constitute the circuit closer W. The cam 80 is so arranged that immediately the disk 50 of the cents section moves the ninety-five cents indicator past the sight opening $w$, to bring the cipher thereon opposite the sight opening, the arm 81, after having been elevated with the terminals $c$, $d$, out of contact, will be released, and the arm will descend and the terminals will be brought into contact completing the circuit, energizing the shunt magnet V and causing its armature 94 to be attracted. To prolong the contact between the terminals of the circuit closer W without unduly extending it, a retarder is used. This retarder may be a dash pot, fan or other device. As shown it is a fly wheel 91 on a shaft carrying a pinion gearing with a wheel 92 that has a pawl engaging with a ratchet secured to a pinion 90, which is revolved on the movement of the arm 81 through the medium of a toothed segment, and connecting arm 93 attached to a lever $b$, on the arm 81. The pawl and ratchet permit the pinion 90 and toothed segment to move in one direction without disturbing the fly-wheel but in the reverse movement of the segment on the downward movement of the arm 81 the fly wheel is coupled therewith. The armature 94 of the shunt magnet V is borne upon by a lever 95 in the circuit S, including the magnet 65, and constituting with a pivoted block 97 the circuit closer U; a spring 98 holding the block in position to be struck by the end of the lever as it rises and falls as the armature 94 is attracted and released. A non-conducting strip 96 on the top and end of the lever 95 prevents the circuit S being closed as the lever rises, but on its descent, rendered gradual by a fly wheel 100 and gears connected with the lever, the lever and block make a contact and closing the circuit S, thus exciting the magnet 65 and imparting a movement of one step to the lowest shaft 61 of the dollars section of the register. As a result of this arrangement if a key of the cents bank is depressed at the same time as a key of the dollars bank, and if the sum added by the depression of the cents key causes the disk 50 to pass the point of its complete revolution while the dollars key is depressed, the circuit will be completed through the terminals $c$, $d$, immediately the disk 50 moves beyond the last "cents" indication to the point of its complete revolution, and the armature 94 and lever 95 will be raised, the latter passing the block 97 idly, and held elevated until the prolonged contact of the terminals $c$, $d$, ceases, thus giving time for the dollars circuit closer to complete its movement. As soon as the contact of the terminals $c$, $d$, ceases the shunt magnet V will be demagnetized, the lever 95 will drop and complete the circuit through the block 97, and the dollars magnet 65 will then be excited, the armature 66 will be attracted and released, and the shaft 61 will be turned one step, so that the lowest disk 60 will show an addition of one to the sum displayed thereby. As the circuit R may be broken before the circuit closer B of the cents bank of keys makes its complete movement, it is desirable to prolong the attraction of the armature 94 of the shunt magnet V until this occurs. For this purpose, the armature 94 forms part of a circuit T, Fig. 17 and has a terminal $e$ which when the magnet V is energized completes the circuit through a disk 26 carried by but insulated from the shaft 3 of said circuit closer B, and through a terminal $i$ also in contact with the disk 26 and in said circuit. The result of closing the circuit T continues the energy of the shunt magnet V after the circuit R has been broken by the separation of the terminals $c$, $d$, until the shaft 3 has made a complete movement and a cutaway portion of the disk 26 arrives over the terminals $e$, $i$, when the circuit T will be broken, the magnet V demagnetized permitting its armature to fall and the shunt circuit S to be momentarily closed by the movement of the lever 95 closing the circuit closer V, and imparting a single impulse to the armature of the magnet 65 of the dollars section of the counter.

In order to readily restore the parts of the upper or higher register or counter to zero at any time I provide means for disconnecting the gears between the shafts 61, and then turning them independently to zero. Thus the gears may be made to slide upon the shafts, or the latter, as shown (see Figs. 3 and 10) are movable longitudinally, and are carried different distances each by means of a carrier J. These carriers as shown consist each of a horizontal plate with a depending forked end partially embracing the adjacent shaft and extending between a collar and a spring thereon (Fig. 12), and the carriers are all loosely connected to and supported by a shifter bar K, arranged above the shafts and pivoted at one end so that as it is swung to the different positions shown in Figs. 3, 9, and 10, the gears 62, 63, will be brought into engagement or carried to different separate positions. The gears 62, 63, are of the ordinary pin and notch construction, that is to say, the one gear has a single peripheral tooth or pin, while the other is provided with peripheral notches so that as the first gear completes a revolution the tooth or pin thereon engages the adjacent gear and turns the latter one step, as will be apparent. As soon as the parts are in the position shown in Fig. 9, each shaft 61 can be freely turned independently of the others and as a ready means of turning each to zero and then arresting it, I provide each with a mutilated gear 99 (see Fig. 11) and I arrange a sliding toothed bar 100 in position to engage with all the gears 99 when they are brought into line. If then, the bar 100 is moved it will revolve each shaft 61 until the flat face $t$ of the gear is above the teeth of the bar, when the disk 60 will be at zero and the further movement of that shaft will be prevented; the movement of the bar 100 will be sufficient to return all of the disks 60 to zero. The bar 100 is moved in one direction by means of a shaft 102 having a pinion 103 and a knob or handle 104, and a spring 105 tends to maintain the bar at the limit of its movement in one direction. The movement of the shafts 61 longitudinally may also be the means of bringing into line a series of printing wheels 106, upon the shafts and of printing therefrom a series of figures corresponding to those displayed at the sight openings. For this purpose a movable platen 107, Fig. 12, is arranged below the plane of the printing wheels when in line as in Fig. 9, and is brought with a suspended strip of paper $f$, against a carbon ribbon $h$, carried by rollers below the wheels. The platen is carried by a pivoted frame 109 connected by a rod 110 with a lever 111 a shoulder of which is struck and then released by a finger 112 upon the shifter bar K as it carries the shafts longitudinally to the position shown in Fig. 9.

The cents counter may be reset at the same time as the resetting of the dollars counter, but as the shaft 52 is not moved longitudinally to bring a resetting pinion into engagement with the toothed bar, the pinion 200 that gears with the bar 100 when the latter is moved for that purpose is made to move upon the shaft 52 while turning therewith. A pin 201, Figs. 9 and 10, on the shaft 52 extends into a diagonal slot 202 in the pinion and a spring 203 presses the pinion toward the bar 100, the ends of the teeth of the pinion being beveled as shown in Fig. 19. As the bar 100 is moved to the right the shaft 52 is prevented from turning by a pawl 54, (Figs. 8, 9 and 10) and the teeth of the bar slide past the beveled ends of the teeth of the pinion which yields and moves in away from the bar, but when the bar is moved in the reverse direction in returning to its normal position, the turning of the pinion owing to the bearing of the side of the slot on the pin 203 throws the pinion inward, keeps it in engagement and it revolves until its flat face meets the teeth of the bar and the disk 50 is arrested with zero at the sight opening $w$.

It is important to prevent two or more keys of either bank from being simultaneously depressed as then two circuit closers would be operated simultaneously and the interfering currents would not register properly. I therefore combine with the keys and circuit closers B a locking device E which permits only one key to be moved at a time locking all the others until the first resumes its normal position. Locking devices of different constructions may be used, but I have shown a series of vertically arranged tongues $m$ Fig. 1 pivoted at the lower ends near the front of the machine below the key-levers, and arranged to permit the levers to move downward between them but so proportioned that on the movement of any two tongues, sufficient for the passage of a lever, the other tongues will be in contact and below the other levers preventing their descent. If a key after being depressed could be at once raised and again depressed it would result in confusion as there would not be time for the circuit closer to complete its movements of the key value. I therefore use a catch device which secures a key after it has risen after being depressed and holds it in position until the circuit closer completes its movement. This is effected by means of a catch plate L, Figs. 5, 13 and 14, with a series of shoulders $r$, one to each key lever 7, a spring $j$ drawing the plate in one direction and a lug 6 on the arm 5 Fig. 2, making contact with a projection 9, on the catch plate and drawing it to the position to carry the shoulders away from the levers 7 when the keys are in their normal positions. When a key lever is depressed the rear end of that lever is elevated, the arm 5 moves and at once carries the lug 6 from the projection 9 and the spring $j$ carries the plate L to bring all the shoulders $r$ above the levers and keep them in place, and until the circuit closer shaft 3 has completed its movement and the lug 6 and projection 9 are again in contact, having moved the plate L back to its normal position, no lever can be moved except that which was just depressed, and after it has been released and descends it will momentarily push back the plate L as it strikes the inclined edge of the catch and will then pass below the shoulder $r$ and is locked like the others, until the lugs 6 contacts with the projection 9, when all the levers will be free, when any one of them may be moved.

One of the main advantages of the register above described is that the key portion may be put in one position, as at a counter, desk, &c., while the register portion can be put in the cashier's office, or a private office where the occupant at a glance can tell the amount of the sales or disbursements up to the moment of inspection. Thus referring to Fig. 18, M represents the section of the register at the salesman's station, the frame of said section supporting the keys, circuit breakers and connected parts and if desired the tablets. N, represents the indicator section provided with a counter and actuating and regulating magnet or magnets while $n$, $n'$, represent the electrical conductors in circuit with the circuit closers, magnets and a battery or other source of electricity X.

In small registers only one bank of keys may be used, and some of the features described may be used without the others. A weight may be used as equivalent of the spring in moving the traveling part of the circuit closer B, and other connections than those described may be used between the key and operating spring or weight and the adjustable parts of the circuit closers.

Without limiting myself to the precise construction and arrangement of parts shown, I claim—

1. A registering machine provided with a bank of keys arranged adjacent to each other, a series of circuit closers, one actuated by each key, and constructed to close the circuit a number of times equal to the number upon the key, and a sight register provided with an actuating electro-magnet in the same circuit as all the circuit closers, substantially as set forth.

2. A registering machine provided with a bank of independent keys, arranged in proximity to each other a series of circuit closers constructed to send each a different number of impulses and mechanism for actuating each of the same from the adjacent key, a register, and an electro-magnet in circuit with each of the circuit closers and having its armature connected to actuate the register, substantially as set forth.

3. In a registering machine a series of keys, a circuit closer to each key, a spring for moving one part of the circuit closer in one direction, connections between each key and the spring whereby to wind and release the same on the movement of each key, and a connection between each key and the other part of the circuit closer whereby to set the latter into contacting position on the movement of its key, substantially as set forth.

4. The combination in a registering machine of a key, a circuit closer having two parts, a spring for moving one part, a connection between the key and the other part for setting said part into contacting position, a detent for holding said part in its set position, and a stop arranged to make contact with and displace said detent as the spring-actuated part of the circuit closer completes its movement, substantially as set forth.

5. The combination with the bank of keys arranged in proximity to each other, register and register-operating electro-magnet of a registering machine, of a series of circuit closers, one to each key and in electric circuit with said magnet, and each with contacting parts corresponding in number to the number upon the connected key, substantially as set forth.

6. The combination of a series of keys and key levers, a shaft carrying a series of toothed disks, a series of slides each with one of the disks constituting a circuit closer, in circuit with the magnet of a register, a spring connected to turn the shaft, a bearing connected with the shaft arranged to make contact with each of the key levers, and a bearing on each slide arranged to make contact with the adjacent lever, substantially as set forth.

7. The combination with circuit closers, each consisting of a traveling contacting piece and an adjustable contacting piece, of a detent for holding each of the latter pieces in contacting position and connections between each key and the adjacent adjustable contacting piece for moving the latter on the movement of a key, substantially as set forth.

8. The combination, with the series of keys and traveling contacting pieces, of a series of slides movable to and from said contacting pieces, detents for holding them in contacting position, and a bearing carried by the traveling contacting pieces arranged to bear upon and move said detent as the movement of said traveling pieces is completed, substantially as set forth.

9. The combination with the keys, of the revolving toothed disks, the slides arranged adjacent to said disks, and key levers arranged to bear upon and lift the slides into contacting position, substantially as described.

10. The combination with the series of toothed disks constituting electrical contact pieces and series of slides having inclined ends and shoulders carrying contact pieces of a movable notched plate constituting a detent for holding all the slides in their elevated positions, substantially as set forth.

11. The combination with the revolving shaft 3, arms 5 and notched disks, of the slides 15, notched plate 20 and bearing 22 on one of the arms, substantially as and for the purpose set forth.

12. The combination with the series of keys, series of circuit closers each having a traveling part, and actuating spring, of a brake or governor for retarding the movement of all of the said traveling parts, substantially as set forth.

13. The combination of series of keys, series of circuit closers connected to be operated by said keys in circuit with said circuit closers, register and operating connections with the electric magnet, and locking device arranged to permit the movement of but one key at a time, substantially as set forth.

14. The combination of two series of keys, a circuit closer for each key, a registering device for each series of keys provided with an actuating magnet in circuit with the circuit closers of such series, and transfer devices between the two registering devices, substantially as set forth.

15. The combination with the keys, circuit closers, registers and magnets, of a circuit closer U in circuit with the magnet of the higher register, a shunt magnet for holding the parts of the circuit closer U out of contact, and a circuit closer W connected with the lower register to complete a circuit through the shunt magnet as the register completes its movement, substantially as set forth.

16. The combination with the lower section of the register and its actuating magnet and keys, of the upper section of the register with its actuating mechanism and keys, of circuit closers for completing the circuit to both magnets, and a retarding device connected with the circuit closer of one of the magnets to prevent both circuit closers from being closed simultaneously, substantially as set forth.

17. The combination of two electro-magnets each connected to operate one section of a register, two series of keys and circuit closers for regulating the currents to the separate magnets, a circuit closer U in circuit with a magnet of the upper circuit of the register, a shunt magnet connected to operate the circuit closer U, and a circuit closer W in circuit with the shunt magnet and connections arranged to close the circuit closer W after the lower section of the register completes its full movement, substantially as set forth.

18. The combination with the register having a cents section and a dollars section and actuating magnet and circuit closer W, of a retarding device, for prolonging the contact between the terminals of said circuit closer substantially as and for the purpose set forth.

19. The combination with the register, actuating magnet and circuit closer W, of the circuit closer U and the retarding device, substantially as set forth.

20. The combination of the two part register and actuating magnets, of the circuit closer W, shunt magnet B and retarding device, and circuit closer U and retarding device, substantially as described.

21. The combination with the two series of keys, circuit closers B, register sections and actuating magnets each in circuit with one of the series of circuit closers B, of a circuit closer W one part movable over the other and arranged in circuit with the shunt magnet, and a retarding device for prolonging the contact of the parts of the circuit closer W, substantially as set forth.

22. The combination with the register and electro-magnet arranged to operate the same, of a series of keys, a shaft carrying a series of disks, each provided with contact points corresponding in number to the number indicated upon the adjacent key, a series of contact pieces 15, and connections between each key and one of the contacting pieces whereby the latter is brought to the contact into position to make contact with the points of the adjacent disk upon the movement of the key, substantially as set forth.

23. The combination of a series of keys, a series of indicators corresponding thereto and normally tending to move into indicating position, and means controlled by the keys for holding said indicators against movement and releasing them upon the operations of the respective keys to permit them to move into indicating position, substantially as set forth.

24. The combination of a series of keys, a series of vertically reciprocating indicator staffs or supports normally tending to drop into indicating position, and means controlled by the keys for upholding said staffs and releasing them upon the operations of the respective keys to permit them to drop to indicating position, substantially as set forth.

25. The combination of a series of keys, a series of indicators corresponding thereto and normally tending to move into indicating position, a series of electro-magnets and means controlled thereby for holding the respective indicators against movement, and a series of circuit-closers actuated by the keys, one in the circuit of each magnet, for releasing the indicators upon the operations of the respective keys, substantially as set forth.

26. The combination of a series of keys, a series of indicators corresponding thereto and normally tending to move into indicating position, a series of detents normally holding said indicators against movement, and connections between the keys and detents for releasing the indicators upon the operation of their corresponding keys, substantially as set forth.

27. The combination of a series of keys, a series of vertically sliding staffs or supports carrying indicators and normally tending to move by gravity into indicating position, a series of detents co-operating with the indicators to normally prevent their gravitating into indicating position, and connections between the detents and keys for releasing an indicator upon the operation of its corresponding key, substantially as set forth.

28. The combination of a series of keys, a series of vertically reciprocating indicator-staffs or supports, a series of detents controlled by the keys for upholding said staffs and operating to release the latter upon the operation of their corresponding keys and permit them to drop to indicating position, substantially as set forth.

29. The combination with the keys of a register, of a series of tablets, a detent to each tablet, the electro-magnet connected to operate each detent, and a circuit closer connected with each key, inserted in the circuit of one of the electro-magnets, substantially as set forth.

30. The combination with the keys of a register, of an indicator consisting of fixed tablets, marked to correspond to the different keys, a movable screen for each tablet, and mechanism for releasing said screen to expose the tablet upon the movement of the corresponding key, substantially as set forth.

31. The combination of the keys, fixed tablets, double screens extending to each side of each tablet and connections between the screens and the keys, for releasing said screens so as to allow them to drop and expose the tablets upon the movement of the key corresponding to the tablet exposed substantially as set forth.

32. The combination of the series of adjacent keys of a register, a series of screens, tablets, staves 33, a detent for each staff and electro-magnet for moving each detent, and a circuit closer in circuit with each of said magnets and connected to be closed on the movement of the corresponding key, substantially as set forth.

33. The combination of a series of keys, a series of vertically sliding staffs or supports carrying indicators and normally tending to move into indicating position, means controlled by the keys for holding said indicators against movement and releasing them upon the operations of the respective keys, and means actuated by the keys for restoring the operated indicators to non-indicating position, substantially as set forth.

34. The combination of a series of keys, a series of indicators corresponding thereto and normally tending to move into indicating position, means controlled by the keys for holding the indicators against movement and releasing them upon the operations of the respective keys to permit them to move into indicating position, and a movable plate or frame common to the series of indicators for restoring the operated indicators to non-indicating position at the succeeding operation of the machine, substantially as set forth.

35. The combination of a series of keys, a series of indicators corresponding thereto and normally tending to move into indicating position, a series of detents for holding the respective indicators against movement, connections between the detents and keys for causing the detents to release the indicators upon the operations of the respective keys, and a movable plate or frame for restoring the operated indicators to non-indicating position at the succeeding operation of the machine, substantially as set forth.

36. The combination of a series of keys, a series of vertically reciprocating indicator-staffs or supports normally tending to drop into indicating position, means controlled by the keys for holding said staffs in elevated position and releasing them upon the operations of the respective keys, and a movable plate or frame common to the staffs for lifting them to non-indicating position, substantially as set forth.

37. The combination of a series of keys, a series of indicators corresponding thereto and normally tending to move into indicating position, a series of electro-magnets and means controlled thereby for holding the indicators against movement, a series of circuit-closers actuated by the keys, one in the circuit of each magnet, for releasing the indicators upon the operations of the respective keys, and means actuated by the keys for restoring the operated indicators to non-indicating position, substantially as set forth.

38. The combination of a series of keys, a series of vertically-reciprocating indicator-staffs or supports, a series of electro-magnets, a series of detents controlled by said magnets and co-operating with the indicator-staffs to hold the latter in elevated position, a series of circuit-closers actuated by the keys, one in the circuit of each magnet, for causing the detents to release the staffs upon the operations of the corresponding keys, and a movable plate or frame common to the indicator staffs for lifting them to non-indicating position upon the succeeding operation of the machine, substantially as set forth.

39. The combination of the keys, indicators, staves and detents and detent actuating devices, of a vertically movable plate 36, and connections for operating the same to restore the staves to position as any key is depressed, substantially as set forth.

40. The combination with the indicators, indicator staves, detents, detent operating devices and keys of a restoring plate 36, and operating arms arranged to make contact with and lift the plate, and then to escape therefrom as any key is depressed, substantially as set forth.

41. The combination with the plate 36, and staves and keys of arms carrying the pawls 44 having shoulder $u$, substantially as set forth.

42. The combination with the series of shafts and numbered disks of a register and with the operating keys thereof, of driving gears connected movably to the shafts, and shifting devices for shifting said gears simultaneously into and out of engagement with each other for the purpose specified.

43. The combination with a series of indicator-disks, shafts 61, movable gears and shifting appliances, and with mutilated pinions 99 upon said shafts, of a sliding rack bar 101 arranged in position to engage with the pinions when the shafts are out of gear, substantially as set forth.

44. The combination of the series of parallel indicator-shafts movable longitudinally, each of said shafts, carrying a disk and a type wheel 106, of a platen movable to and from the type wheels, substantially as set forth.

45. The combination of the keys, indicator-shafts 61, gears, and carriers J connected to move said gears, of a shifter lever K connected with all of said carriers, and means for rotating said shafts from the keys, substantially as and for the purpose specified.

46. The combination of the shafts 61, gears, carriers, and shifter lever K, of a platen carried by a frame 109, connected with the shifter to be operated thereby, substantially as set forth.

47. The combination of a registering wheel having a mutilated pinion turning with it and movable longitudinally of its axis, and a movable rack-bar co-operating with the pinion to restore the wheel to initial position, substantially as set forth.

48. The combination of a series of registering wheels, each provided with a mutilated pinion turning with it and movable longitudinally of its axis, means for shifting the pinions into line, and a movable rack-bar co-operating with the pinions to restore the wheels to initial position, substantially as set forth.

49. The combination of a series of registering wheels normally in driving gear or connection with each other and each provided with a mutilated pinion turning with the wheel and movable longitudinally of its axis, means for simultaneously throwing the registering wheels out of gear with each other and shifting the pinions into line, and a reciprocating rack-bar co-operating with the pinions to restore the wheels to initial position, substantially as set forth.

50. The combination of a series of rotary and longitudinally reciprocating shafts normally in driving gear or connection with each other, a registering wheel and a mutilated pinion fast upon each shaft, means for sliding the shafts longitudinally to throw them out of gear and to bring the mutilated pinions into line with each other, and a reciprocating rack-bar co-operating with the pinions to restore the wheels to initial position, substantially as set forth.

51. The combination of a series of rotary and longitudinally reciprocating shafts normally in driving connection or gear with each other, a registering wheel and a mutilated pinion fast upon each shaft, the registering wheels being located in approximately the same plane, while the mutilated pinions are located in different planes at different distances from the registering wheels, a shifter co-operating with the series of shafts to slide them longitudinally different distances, to throw them out of connection with each other and to bring the mutilated pinions into line, and a reciprocating rack co-operating with the pinions to restore the wheels to initial position, substantially as set forth.

52. The combination with the keys, register, operating magnet and circuit closers connected to be operated by the separate keys, of a catch device arranged to lock each key in position during the movement of the circuit closers, substantially as set forth.

53. The combination of the series of keys, and circuit closers, of a catch plate L having a series of shoulders r, and connections for shifting the catch plate out of engagement with the levers as the circuit closers complete their movements, for the purpose set forth.

54. The combination in a registering device of a series of keys a series of circuit closers and a series of tablets connected to be operated by the keys arranged in one position, as at the counter of a store, and an adding or counting device and electro magnets arranged in another position, as in an office, with the circuit closers of the key part in electrical connection with the operating magnets of the counting device, substantially as set forth.

55. A registering device in two separated parts, the frame of one part supporting a series of adjacent keys and a series of circuit closers and means for preventing more than one key being actuated at one time, the frame of the other part supporting an adding device and operating magnet or magnets, and conductors extending between and including the circuit closers of one part, the magnets of the other and a generator of electricity, substantially as set forth.

In testimony whereof I have signed my name to this specification in the presence of two subscribing witnesses.

LEO EHRLICH.

Witnesses:
E. S. KNIGHT,
THOMAS KNIGHT.